United States Patent
Hsieh et al.

(10) Patent No.: US 10,075,237 B2
(45) Date of Patent: Sep. 11, 2018

(54) VISIBLE LIGHT COMMUNICATION SYSTEM AND METHOD

(71) Applicant: INSTITUTE FOR INFORMATION INDUSTRY, Taipei (TW)

(72) Inventors: Hsiang-Chain Hsieh, New Taipei (TW); Chi-Wai Chow, Hong Kong (CN); Yen-Ting Chen, Taipei (TW); Chia-Wei Chen, Tainan (TW); Wei-Chung Wang, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/376,884

(22) Filed: Dec. 13, 2016

(65) Prior Publication Data

US 2018/0159622 A1    Jun. 7, 2018

(30) Foreign Application Priority Data

Dec. 2, 2016    (TW) .............................. 105139964 A

(51) Int. Cl.
*H04B 10/00*    (2013.01)
*H04B 10/116*    (2013.01)
*H04N 5/374*    (2011.01)

(52) U.S. Cl.
CPC ........... *H04B 10/116* (2013.01); *H04N 5/374* (2013.01)

(58) Field of Classification Search
CPC . H04B 10/116; H04B 10/114; H04B 10/1141; H04B 10/1143; H04B 10/1149; H04N 5/374; H04N 5/2258; H04N 5/359
(Continued)

(56) References Cited

U.S. PATENT DOCUMENTS 9,698,908 B2 *    7/2017    Breuer ................ H04B 10/116
2008/0151083 A1 *    6/2008    Hains .................... H04N 9/045
348/273

(Continued)

FOREIGN PATENT DOCUMENTS

CN    105716614 A    6/2016
CN    106068678 A    11/2016
WO    WO 2015121154 A1 *    8/2015    ......... H05B 37/0272

OTHER PUBLICATIONS

Liu et al, Comparison of Thresholding schemes for visible light communication using mobile-phone image sensor, Jan. 2016, OSA.*

(Continued)

*Primary Examiner* — Ken N Vanderpuye
*Assistant Examiner* — Amritbir Sandhu
(74) *Attorney, Agent, or Firm* — Skaar Ulbrich Macari, P.A.

(57)    ABSTRACT

Disclosed are a visible light communication system and a visible light communication method. In this system, a signal transmitter sends a visible light signal, and a signal light receiver capture an image of the visible light signal to recover the visible light signal according to the captured image. The signal receiver includes an image capturing module, an image processing module and a signal recovery module. The method includes: capturing an image of a visible light signal; processing the captured image of the visible light signal; determining whether there is a complete packet according to the processed image; if yes, directly recovering the visible light signal according to the processed image; but if no, executing a packet recovery process according to the processed image of the visible light signal, then obtaining the complete packet and recovering the visible light signal transmitted from the signal transmitter.

14 Claims, 8 Drawing Sheets

(58) Field of Classification Search
USPC .................................................. 398/118–131
See application file for complete search history.

(56) References Cited

U.S. PATENT DOCUMENTS

| | | | | |
|---|---|---|---|---|
| 2011/0074997 | A1* | 3/2011 | Border | H04N 5/347 348/311 |
| 2012/0075534 | A1* | 3/2012 | Katz | H04N 9/3182 348/602 |
| 2014/0314420 | A1* | 10/2014 | De Bruijn | H05B 37/0272 398/127 |
| 2015/0093102 | A1* | 4/2015 | Oguchi | G03B 11/043 396/435 |
| 2015/0109486 | A1* | 4/2015 | Ramalingaiah | H04N 5/359 348/241 |
| 2016/0028477 | A1* | 1/2016 | Jovicic | H04B 10/116 398/118 |
| 2016/0047890 | A1* | 2/2016 | Ryan | G01S 5/16 398/118 |
| 2016/0112126 | A1* | 4/2016 | Nijssen | H04B 10/116 398/118 |
| 2016/0127064 | A1* | 5/2016 | Liu | H04J 3/076 370/294 |
| 2016/0164603 | A1* | 6/2016 | De Bruijn | H04B 10/116 398/118 |
| 2016/0323035 | A1* | 11/2016 | Jovicic | H04B 10/0795 |
| 2016/0359558 | A1* | 12/2016 | Baggen | H04B 10/116 |
| 2016/0359561 | A1* | 12/2016 | Baggen | H04B 10/116 |
| 2017/0093490 | A1* | 3/2017 | Breuer | H04B 10/116 |
| 2017/0093491 | A1* | 3/2017 | Breuer | H04B 10/07953 |
| 2017/0237488 | A1* | 8/2017 | Aoyama | H04B 10/116 398/118 |

OTHER PUBLICATIONS

Chow et al; Visible light communication using mobile-phone camera with data rate higher than frame rate; Sep. 2016; OSA.*
Liu et al; Comparison of thresholding schemes for visible light communication using mobile-phone image sensor; Jan. 2016; Optical society of America; pp. 1973-1978.*
Chow et al; visible light communication using mobile-phone camera with data rate higher than frame rate; Sep. 2015; Optical society of America; pp. 26080-26085.*
Taiwan Patent Office, Office action dated Jun. 27, 2017.

* cited by examiner

VISIBLE LIGHT COMMUNICATION SYSTEM AND METHOD

BACKGROUND OF THE INVENTION

1. Field of the Invention

The instant disclosure relates to a visible light communication system and a visible light communication method; in particular, to a visible light communication system and a visible light communication method that directly use an image sensor of a mobile device, such as a CMOS image sensor, as a signal receiver.

2. Description of Related Art

The communication signal of the Visible Light Communication (VLC) is the only wireless communication signal that can be seen by human eyes. The signal light source of a VLC system is usually a Light Emitting Diode (LED) or a fluorescent light, and the visible light signal transmission is implemented by the flashing of the LED or the fluorescent light. Especially, when the signal light source of a VLC system is a white LED, the white LED has a high luminosity and a high modulating rate, so human cannot see the flashing of the white LED. Thus, the visible light communication technology can be a communication technology that can simultaneously provide an illumination function and data transmission function.

In the prior art, the photo detector is usually configured at the reception end of a traditional VLC system to receive a visible light signal. However, the volume of the photo detector is large so that it needs more room to configure the reception end of the traditional visible light communication system. Also, there may be an external power supply needed to drive the photo detector. Moreover, in the traditional VLC system, the same packet needs to be sent three or more than three times within one image capturing period to make the packet be completely received. However, even so, there still may be a packet loss problem.

SUMMARY OF THE INVENTION

The instant disclosure provides a visible light communication system. The visible light communication system comprises a signal transmitter and a signal receiver. The signal transmitter is configured to transmit a visible light signal. The signal receiver is configured to capture an image of the visible light signal and to recover the visible light signal according to the captured image of the visible light signal. The signal receiver comprises an image capturing module, an image processing module and a signal recovery module. The image capturing module captures the image of the visible light signal. The image processing module is connected to the image capturing module. The image processing module processes the captured image of the visible light signal. The signal recovery module is connected to the image processing module. The signal recovery module determines whether there is a complete packet in the image of the visible light signal according to the processed image of the visible light signal. The signal recovery module directly recovers the visible light signal according to the processed image of the visible light signal, if the signal recovery module determines that there is the complete packet in the image of the visible light signal. On the other hand, the signal recovery module executes a packet recovery process according to the processed image of the visible light signal to obtain the complete packet and to recover the visible light signal, if the signal recovery module determines that there is no complete packet in the image of the visible light signal.

In one embodiment of the visible light communication system provided by the instant disclosure, the image capturing module is a CMOS image sensor. In another embodiment of the visible light communication system provided by the instant disclosure, when the signal transmitter is transmitting the visible light signal, a time duration when two identical packets are sequentially sent exactly equals to an image capturing period of the image capturing module. In addition, the image capturing period comprises a shutter opening duration and a shutter closing duration.

The instant disclosure further provides a visible light communication method that is adapted to a visible light communication system. The visible light communication system comprises a signal transmitter and a signal receiver. The signal transmitter is configured to send a visible light signal, and the signal receiver is configured to capture an image of the visible light signal and to recover the visible light signal according to the captured image of the visible light signal. The signal receiver comprises an image capturing module, an image processing module and a signal recovery module. The image processing module is connected to the image capturing module, and the signal recovery module is connected to the image processing module. The visible light communication method comprises: through the image capturing module, capturing the image of the visible light signal; through the image processing module, processing the captured image of the visible light signal; through the signal recovery module, determining whether there is a complete packet in the image of the visible light signal according to the processed image of the visible light signal; through the signal recovery module, directly recovering the visible light signal according to the processed image of the visible light signal, if the signal recovery module determines that there is the complete packet in the image of the visible light signal; and through the signal recovery module, executing a packet recovery process according to the processed image of the visible light signal to obtain the complete packet and to recover the visible light signal, if the signal recovery module determines that there is no complete packet in the image of the visible light signal.

In one embodiment of the visible light communication method provided by the instant disclosure, the image capturing module is a CMOS image sensor. In another embodiment of the visible light communication method provided by the instant disclosure, when the signal transmitter is transmitting the visible light signal, a time duration when two identical packets are sequentially sent exactly equals to an image capturing period of the image capturing module. In addition, the image capturing period comprises a shutter opening duration and a shutter closing duration.

One of differences between a traditional visible light communication system and the instant disclosure is that, the traditional visible light communication system needs a Photo Detector (PD) configured at a reception end of the traditional visible light communication system. However, the volume of the PD is large so that it needs more room to configure the reception end of the traditional visible light communication system. On the other hand, the visible light communication system provided by the instant disclosure directly uses a camera of a mobile device, such as a CMOS camera of a mobile device, as a image capturing module of a visible light signal receiver. In addition, in the instant disclosure, the same packet only needs to be sent twice, but in the traditional visible light communication system, the same packet at least needs to be sent three times. Thus, the instant disclosure has a better signal transmission efficiency. Moreover, in the traditional visible light communication system, even the same packet is sent three or more than three times in one image capturing period, there still may be a packet loss problem. However, the instant disclosure has a packet recovery process, which can effectively avoid the packet loss.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

[One Embodiment of the Visible Light Communication System]

Figure 1:
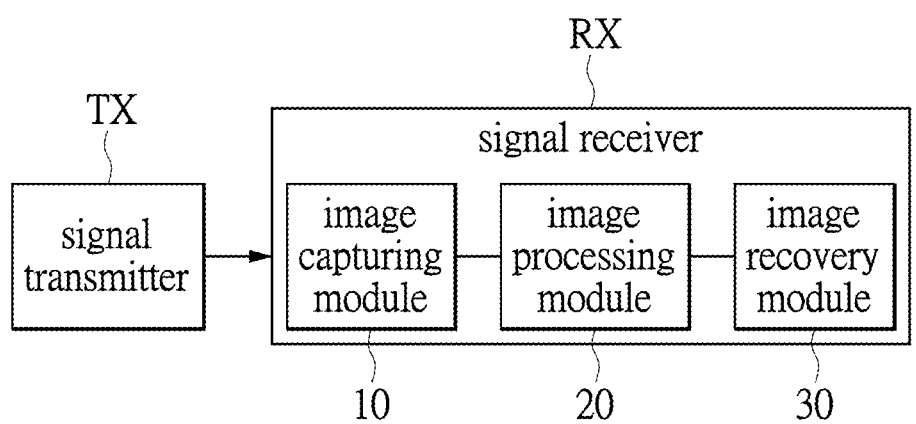
FIG. 1 shows a block diagram of a visible light communication system of one embodiment of the instant disclosure.

Referring to FIG. 1, FIG. 1 shows a block diagram of a visible light communication system of one embodiment of the instant disclosure. As shown in FIG. 1, the visible light communication system 1 in this embodiment mainly comprises a signal transmitter TX and a signal receiver RX. The signal transmitter TX is configured to send a visible light signal. The signal receiver RX is configured to capture an image of the visible light signal sent from the signal transmitter TX, and to recover the visible light signal sent from the signal transmitter TX according to the captured image. The signal source of the visible light signal sent from the signal transmitter TX can be the fluorescent light, the light emitting diode (LED) or the like. Generally speaking, the wave length of the visible light is within a range from 375 nm to 780 nm. For example, if the signal source is a common fluorescent lamp, and the transmission efficiency of the visible light signal is roughly 10 kbit/s; if the signal source is a LED, and the transmission efficiency of the visible light signal can be roughly 500 Mbit/s.

Again referring to FIG. 1, in the visible light communication system 1, the signal receiver RX mainly comprises an image capturing module 10, an image processing module 20 and a signal recovery module 30. The image processing module 20 is connected to the image capturing module 10, and the signal recovery module 30 is connected to the image processing module 20. The signal receiver RX captures an image of a visible light signal sent from the signal transmitter TX through the image capturing module 10. One of the features of the instant disclosure is that, the image capturing module 10 can be a CMOS image sensor. Specifically speaking, the visible light communication system 1 can directly use the camera of a mobile device, such as a smart phone, a tablet or the like, as the image capturing module 10. In this manner, there is no need to have an external power supply to drive the image capturing module 10. In addition, compared with a traditional visible light communication system that uses a photo detector as a signal receiver, the visible light communication system 1 have a smaller volume because it uses a CMOS image sensor as the image capturing module 10 of the signal receiver RX, instead of the photo detector. Moreover, the signal receiver RX in the visible light communication system 1 can receive a signal of which the transmission speed is faster than the frame rate of the image capturing module 10, such as a CMOS camera.

In the visible light communication system 1, the image processing module 20 is configured to process the captured image of the visible light signal, such that the signal recovery module 30 can determine whether there is a complete packet received according to the processed image of the visible light signal. The main working mechanism of the visible light communication system 1 is that, if the signal recovery module 30 determines that there is a complete packet received according to the processed image of the visible light signal, the signal recovery module 30 can directly obtain the packet according to the image of the visible light signal, and then can recover the visible light signal sent from the signal transmitter TX by using the obtained packet. On the other hand, if the signal recovery module 30 determines that there is no complete packet received according to the processed image of the visible light signal, the signal recovery module 30 executes a packet recovery process to obtain the packet according to the image of the visible light signal and then recovers the visible light signal sent from the signal transmitter TX by using the obtained packet.

The following description is to describe how the image processing module 20 in the visible light communication system 1 processes the image of the visible light signal, such that the signal recovery module 30 can determine whether there is a complete packet received according to the processed image of the visible light signal.

Figure 2A:
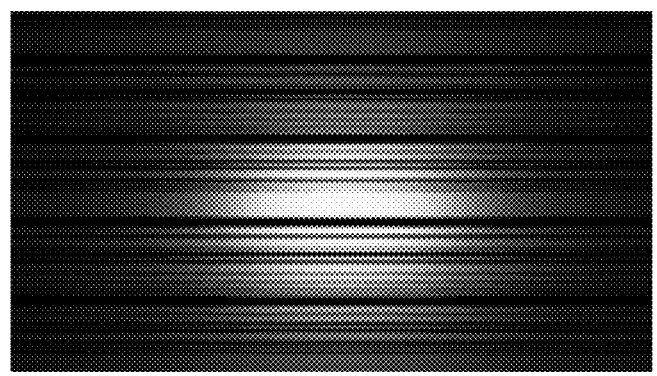
FIG. 2A is a schematic diagram showing an image of a visible light signal captured by a signal receiver in the visible light communication system of one embodiment of the instant disclosure.
Figure 2B:
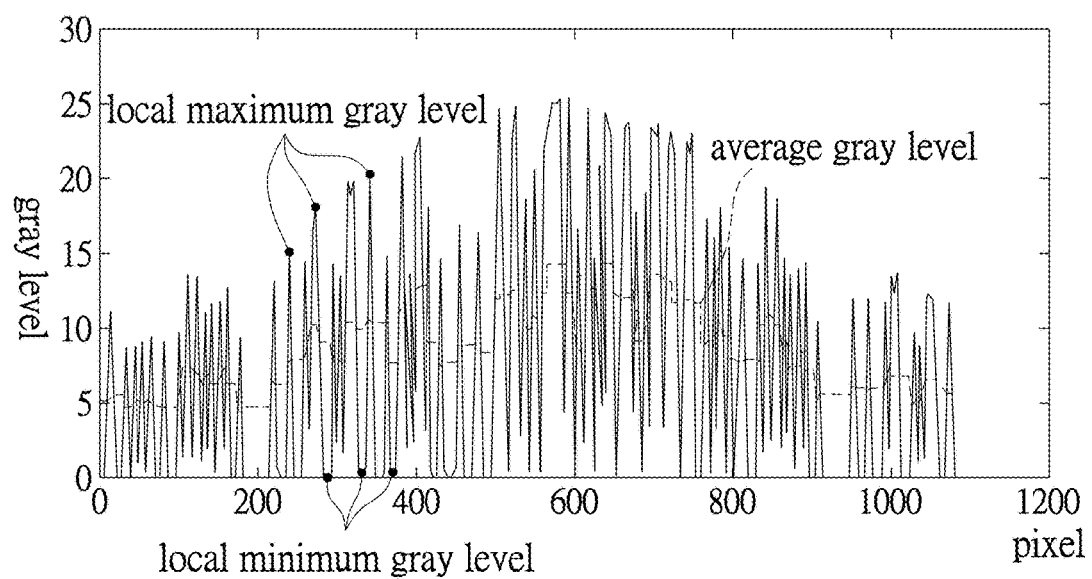
FIG. 2B is a curve diagram showing the relationship between the gray level and the pixels of the processed image of a visible light signal.

Referring to FIGS. 2A-2B, FIG. 2A is a schematic diagram showing an image of a visible light signal captured by a signal receiver in the visible light communication system of one embodiment of the instant disclosure, and FIG. 2B is a curve diagram showing the relationship between the gray level and the pixels of the processed image of a visible light signal.

In the visible light communication system 1, the visible light signal transmission is implemented by the flashing of the fluorescent light or the LED. As shown in FIG. 2A, there are a plurality of bight fringes and a plurality of dark fringes in an image of the visible light signal captured by the image capturing module 10. After the image capturing module 10 captures an image of the visible light signal, the image processing module 20 processes the image of the visible light signal, such that the signal recovery module 30 can determine whether there is a complete packet received according to the processed image of the visible light signal.

Figure 2C:
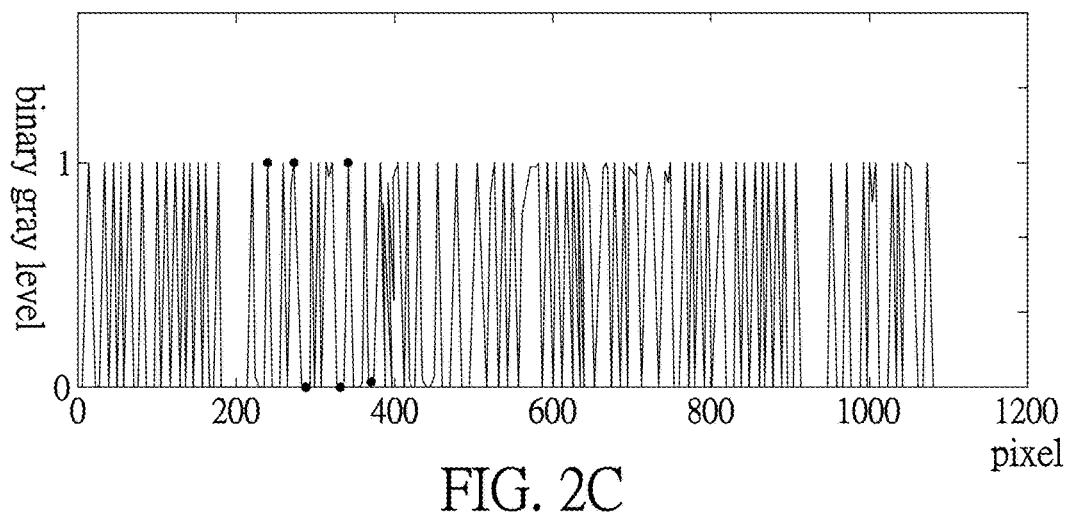
FIG. 2C is a curve diagram showing the relationship between the binary gray level and the pixels of the processed image of a visible light signal.

First, the image processing module 20 detects edges of the captured image of the visible light signal to obtain a gray-level image. It should be noted that, the skilled in the art should be familiar with the working mechanism relevant to how the image processing module 20 detects edges of the captured image of the visible light signal, and thus the redundant information is not repeated. After that, in order to reduce the risk that the image of the visible light signal may be excessively exposed to make the visible light signal unable to be correctly recovered, the image processing module 20 executes a binary conversion for the obtained gray-level image. Specifically speaking, the image processing module 20 first obtains a curve diagram showing the pixels in the gray-level image and their gray levels, which is shown as FIG. 2B. Take the CMOS image sensor of the Apple® Iphone6, in FIG. 2B, the horizontal axis represents for the pixels from the first row to the $1080^{th}$ row in any column of the image of the visible light signal, and the vertical axis represents for the gray level of the pixels from the first row to the $1080^{th}$ row in any column of the image of the visible light signal. According to FIG. 2B, the image processing module 20 can obtain a plurality of local maximum gray levels and a plurality of local minimum gray levels. The image processing module 20 calculates a threshold for executing the binary conversion for the gray-level image. As shown in FIG. 2B, this threshold is an average gray level of each two adjacent local maximum gray level and local minimum gray level (that is, the curve Cavg shown in FIG. 2B). Finally, according to the calculated average gray levels, the processing module 20 executes the binary conversion for the gray-level image. During the binary conversion, the processing module 20 thresholds the gray-level image according to the average gray levels. Specifically, the processing module 20 sets 1 as a binary gray level of the pixels having gray levels larger than the average gray levels and sets 0 as a binary gray level of the pixels having gray levels smaller than the average gray levels. In this manner, the processing module 20 obtains FIG. 2C, which is a curve diagram showing the relationship between the binary gray level and the pixels of the processed image of a visible light signal.

Generally speaking, a complete packet comprises a header and data. In this embodiment, the pixels where a header is located have 0 as their binary gray levels. This, the signal recovery module 30 first determines whether the number of the sequential pixels having 0 as the binary gray level equals to or larger than a predetermined pixel number according to FIG. 2C. If the number of the sequential pixels having 0 as the binary gray level equals to or larger than a predetermined pixel number according to FIG. 2C, the signal recovery module 30 determines that there is a header H of a packet located at these sequential pixels (that is, in FIG. 2C, the pixels from the $195^{th}$ row to the $205^{th}$ row and the pixels from the $990^{th}$ row to the $1000^{th}$ row).

Another feature of the visible light communication system 1 is that, in the visible light communication system 1, when the signal transmitter TX is transmitting the visible light signal, a time duration when two identical packets are sequentially sent exactly equals to an image capturing period of the image capturing module 10. Specifically speaking, take a CMOS image sensor as an example, the image capturing period comprises a shutter opening duration and a shutter closing duration. Within the shutter opening duration, the CMOS image sensor can receive the visible light signal, but within the shutter closing duration, the CMOS image sensor cannot receive the visible light signal. Accordingly, when the signal transmitter TX in the visible light communication system 1 is sending the visible light signal, the same packet only needs to be sequentially sent twice and this packet can be completely obtained by the signal receiver RX. In this manner, the packet loss problem can be effectively avoided.

The following description is to describe how the signal recovery module 30 determines whether there is a complete packet received according to the processed image of the visible light signal, and to describe how the signal recovery module 30 executes the packet recovery process when there is no complete packet received according to the processed image of the visible light signal.

As mentioned above, according to the image of the visible light signal processed by the image processing module 20, the signal recovery module 30 can determine how many headers can be found in the image of the visible light signal, and the signal recovery module 30 can also determine that the found header(s) H are located at which sequential pixels.

When the signal recovery module 30 finds headers H of the two same packets in the image of the visible light signal, the signal recovery module 30 determines that there is a complete packet received. On the other hand, when the signal recovery module 30 only finds a header H of one of the two same packets in the image of the visible light signal, the signal recovery module 30 determines that there is no complete packet received. Thus, the signal recovery module 30 executes a packet recovery process according to the image of the visible light signal.

Figure 3A:
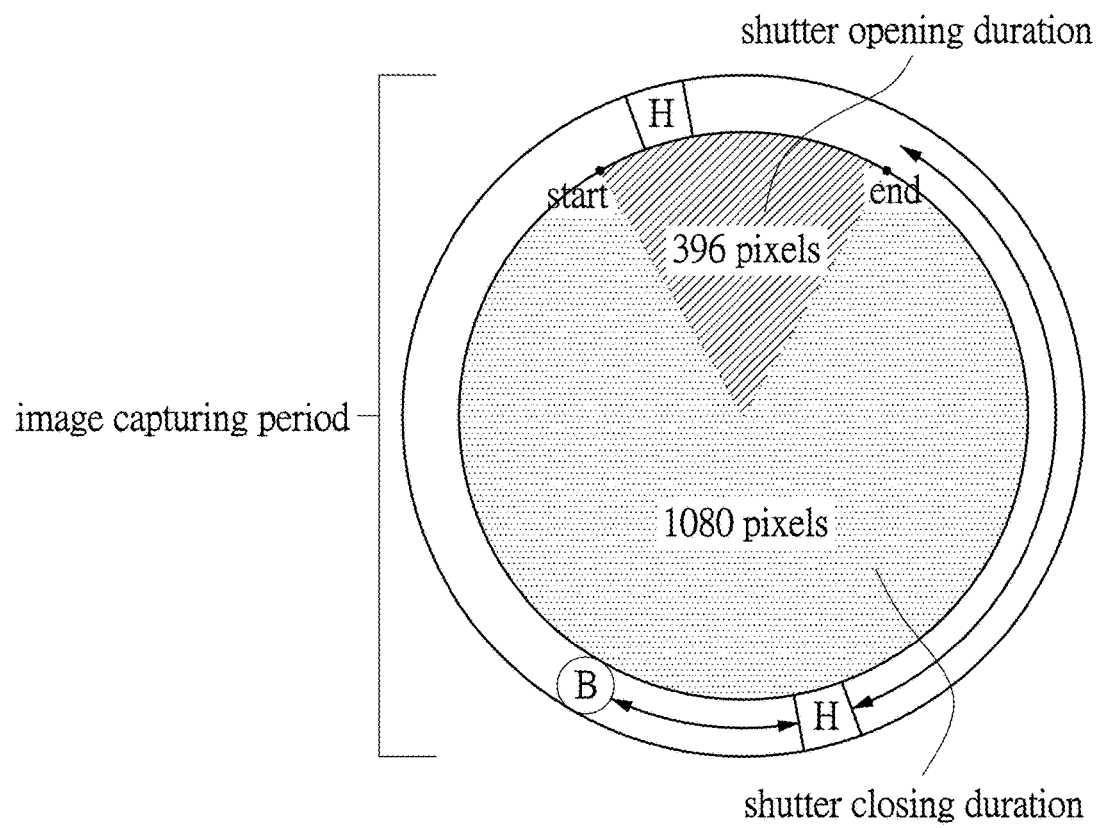
FIG. 3A is a schematic diagram showing how the signal recovery module determines that there is no complete packet in the image of a visible light signal and showing how the signal recovery module executes a packet recovery process, in the visible light communication system of one embodiment of the instant disclosure.
Figure 3B:
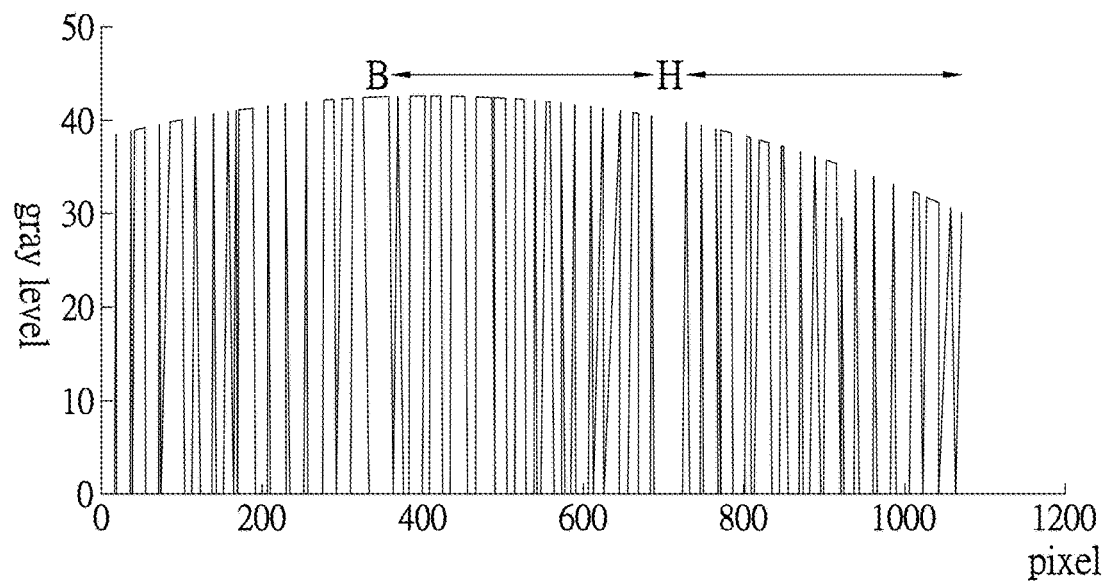
FIG. 3B is a curve diagram showing the relationship between the gray level and the pixels of the processed image having an incomplete packet.
Figure 3C:
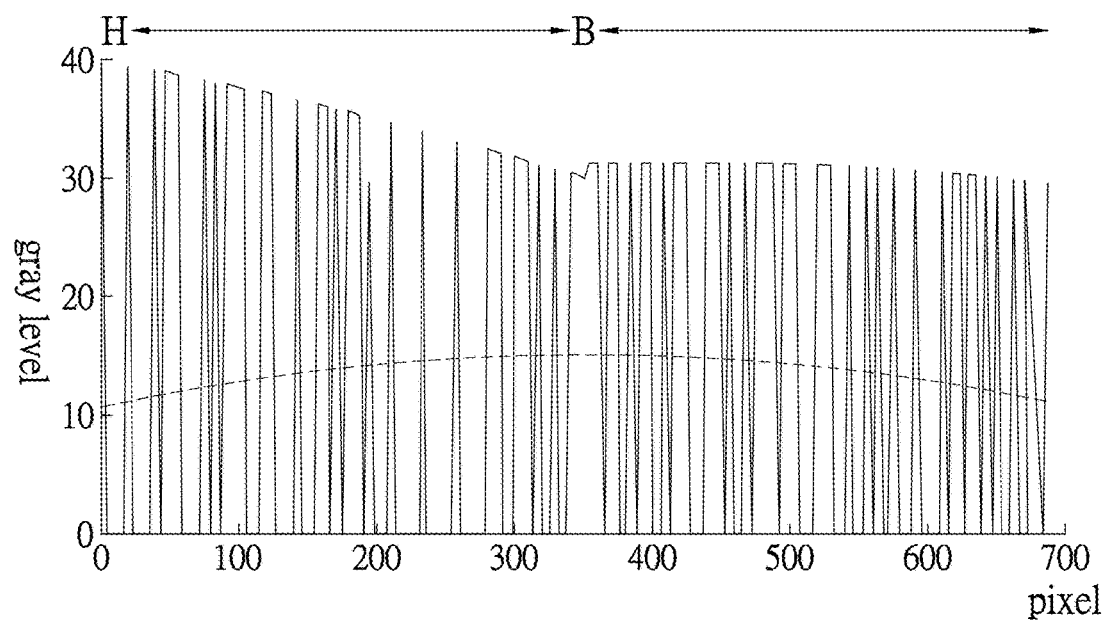
FIG. 3C is a curve diagram showing the relationship between the gray level and the pixels of the processed image after a packet recovery process is executed.

Referring to FIGS. 3A-3C, FIG. 3A is a schematic diagram showing how the signal recovery module determines that there is no complete packet in the image of a visible light signal and showing how the signal recovery module executes a packet recovery process, in the visible light communication system of one embodiment of the instant disclosure, FIG. 3B is a curve diagram showing the relationship between the gray level and the pixels of the processed image having an incomplete packet, and FIG. 3C is a curve diagram showing the relationship between the gray level and the pixels of the processed image after a packet recovery process is executed.

As shown in FIG. 3A, under the situation in which the signal recovery module 30 only finds a header H of one of the two same packets in the image of the visible light signal, the signal recovery module 30 converts the shutter opening duration to a number of pixels in one column of the image of the visible light signal. After that, the signal recovery module 30 correspondingly converts the shutter closing duration to a number of pixels. For example, take the CMOS camera of the Apple® Iphone 6 as an example of the image capturing module 10, the CMOS camera can only receive the visible light signal within its shutter opening duration, so its shutter opening duration can be converted to a number of pixels in one column of the image of the visible light signal. In addition, the number of pixels corresponding to the shutter closing duration of the CMOS camera can be obtained via an Equation (1).

$$\text{Frame Time} = (PCMOS + Pgap) \times (\text{Sampling-Rate}) - 1 \times (\text{Packet-Length}) - 1 \times (\text{Packet Time}) \quad \text{Equation (1)}$$

In the Equation (1), PCMOS is the total pixel number in one column of the image of the visible light signal, and Pgap is the pixel number corresponding to the shutter closing duration. The Sampling-Rate is the sampling rate of the visible light communication system 1, and the unit of the Sampling-Rate is "pixel/bit". The unit of the Packet-Length is "bit". Packet Time is the time consumed when a packet is transmitted from a signal transmitter to a signal receiver. Frame Time is the image capturing period of the image capturing module 10. Simply speaking, PCMOS and Pgap are related to the hardware specification of the image capturing module 10. For example, for the CMOS cameras having the same hardware specification, they have the same PCMOS and the same Pgap. If the CMOS image sensor is the CMOS camera of the Apple® Iphone 6, as shown in FIG. 3A, the shutter opening duration of the CMOS camera will be converted to 1080 pixels. If the Sampling-Rate is known as 4.01 bit/pixel, the Packet-Length is known as 84 bits (that is, a header having 12 bits and data having 72 bits), the Packet Time is known as $\frac{1}{120}$ S, and the Frame Time is known as $\frac{1}{60}$ S, the Pgap can be obtained via the Equation (1), which is roughly 396 pixels.

After the total pixel number in one column of the image of the visible light signal (that is, PCMOS) and the pixel number corresponding to the shutter closing duration (that is, Pgap) are obtained, the signal recovery module 30 can determine that a header H of one of the packets is located at which pixels according to the processed image of the visible light signal, and can mark these pixels where the header H is located (as shown by the H in FIG. 3A). According to the total pixel number in one column of the image of the visible light signal and the pixel number corresponding to the shutter closing duration, the signal recovery module 30 can find a pixel where a beacon B is located (as shown by the B in FIG. 3A). The signal recovery module 30 finds the pixel where the beacon B is located according to an Equation (2).

$$P\text{beacon} = PCMOS - (PCMOS + Pgap)/2 + 1 \quad \text{Equation (2)}$$

In Equation (2), Pbeacon is the pixel where the beacon B is located, PCMOS is the total pixel number in one column of the image of the visible light signal, and Pgap is the pixel number corresponding to the shutter closing duration. In the above example wherein the CMOS image sensor is the CMOS camera of the Apple® Iphone 6, PCMOS is 1080 and Pgap is 396, and thus Pbeacon can be obtained according to the Equation (2), which is 373. In other words, the beacon is located at the $373^{th}$ pixel among the total pixels in one column of the image of the visible light signal.

It can be known from FIG. 3A, part of the packet is received by the signal receiver RX within the shutter closing duration (that is, from the beginning of the shutter opening duration "start" to the end of the shutter opening duration "end"). From another aspect, part of the packet (that is, the packet segment from the end of the shutter opening duration "end", which is the $1080^{th}$ pixel among the total pixels in one column of the image of the visible light signal, to a header H of another packet) reaches the signal receiver RX within the shutter closing duration. Thus, within the shutter opening duration, the mage capturing module 10 can only obtained an incomplete packet, which is from the header H to the end of the shutter opening duration "end", wherein the header H is located at the $700^{th}$ pixel among the total pixels in one column of the image of the visible light signal according to FIG. 3B. However, from FIG. 3A, it can be found that, the packet segment reaching the signal receiver RX within the shutter closing duration is the packet segment from the beacon B (located at the $373^{th}$ pixel among the total pixels in one column of the image of the visible light signal) to the header H. Thus, in this embodiment, the packet can be recovered by copying a packet segment from the pixel where the beacon B is located to one pixel before the pixel where the header H is found (that is, the $(700-1)^{th}$ pixel among the total pixels in one column of the image of the visible light signal) and pasting the packet segment to the end of the incomplete packet (that is, the packet segment from H to "end").

From FIG. 3B and FIG. 3C, it can be found that, the pixel data, which is the gray level, in FIG. 3B from the beacon B to one pixel before the pixel where the header H is found will be copied and pasted to the beacon B in FIG. 3C to recover the complete packet. In other words, the recovered packet, which is a complete packet, comprises data of roughly 700 pixels as shown in FIG. 3C.

Figure 4A:
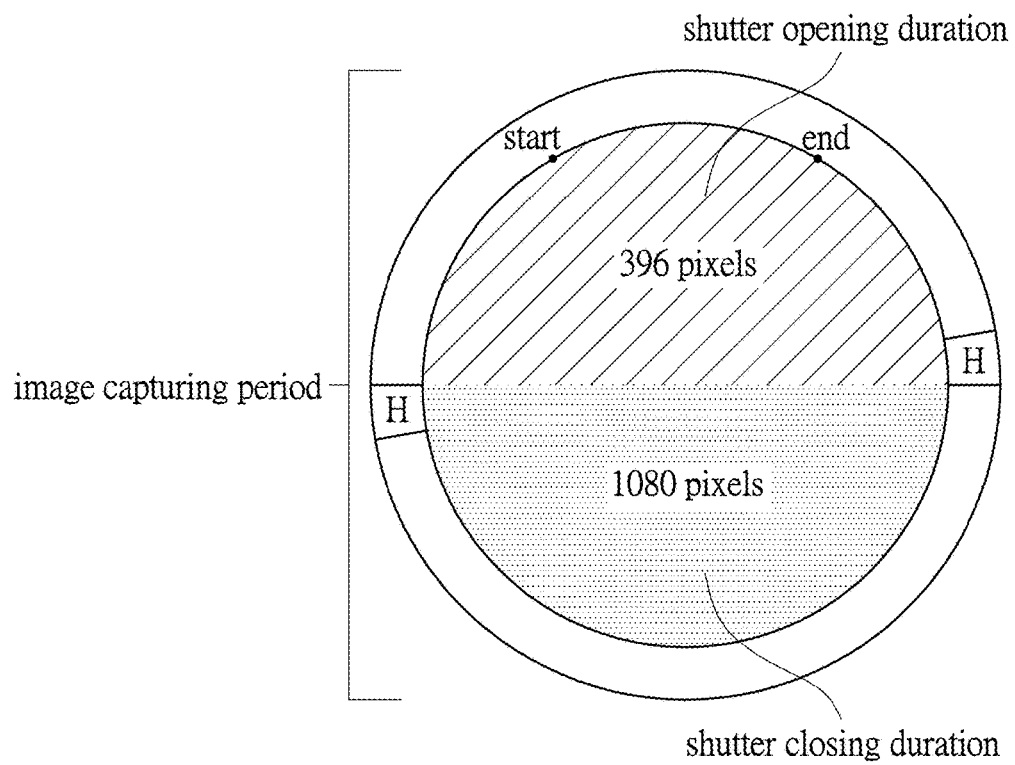
FIG. 4A is a schematic diagram showing how the signal recovery module determines that there is a complete packet in the image of a visible light signal.
Figure 4B:
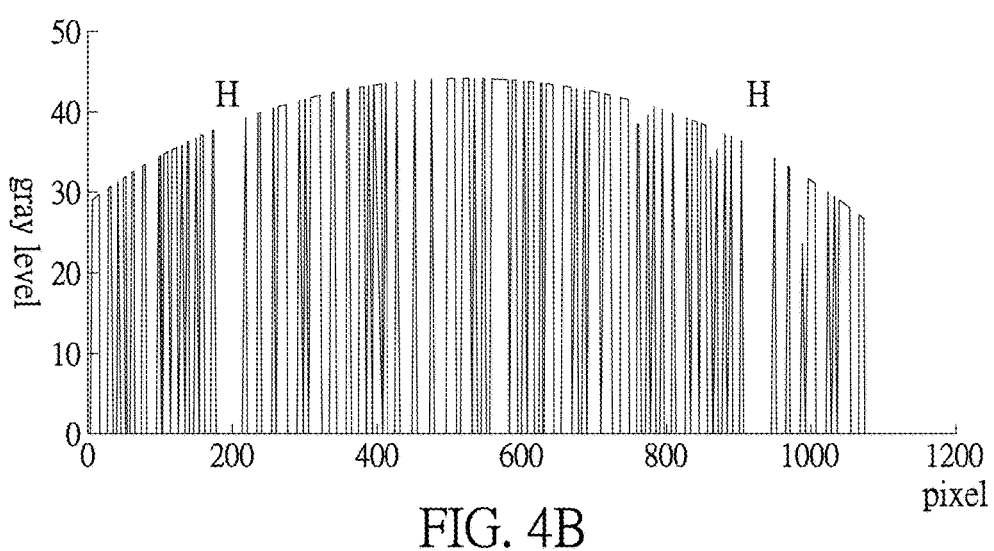
FIG. 4B is a curve diagram showing the relationship between the gray level and the pixels of the processed image having a complete packet.

On the other hand, under the situation in which the signal recovery module 30 finds headers H of the two same packets in the image of the visible light signal, the signal recovery module 30 can directly obtain the complete packet. Referring to FIG. 4A and FIG. 4B, FIG. 4A is a schematic diagram showing how the signal recovery module determines that there is a complete packet in the image of a visible light signal, and FIG. 4B is a curve diagram showing the relationship between the gray level and the pixels of the processed image having a complete packet.

As shown in FIG. 4A, the signal recovery module 30 can find headers H of the two same packets in the image of the visible light signal. In this case, within one image capturing period of the image capturing module 10, one of packet is completely received by the signal receiver RX within the shutter opening duration, which is from the beginning of the shutter opening duration "start" to the end of the shutter opening duration "end". Thus, the signal recovery module 30 can directly obtain all data in this complete packet to recover the visible light signal sent from the signal transmitter TX.

According to the above description, in this embodiment, the signal recovery module 30 may only find a header of one of the two identical packets, but a complete packet can be still obtained by executing a packet recovery process. As know by the skilled in the art, for a traditional visible light communication system, the same packet needs to be sent at least three times within one image capturing period, and even so, there may be a packet loss problem. Compared with the traditional visible light communication system, for the visible light communication system 1 in this embodiment, the same packet only needs to be sequentially sent twice within one image capturing period, and the packet is unlikely to be lost.

[One Embodiment of the Visible Light Communication Method]

Figure 5A:
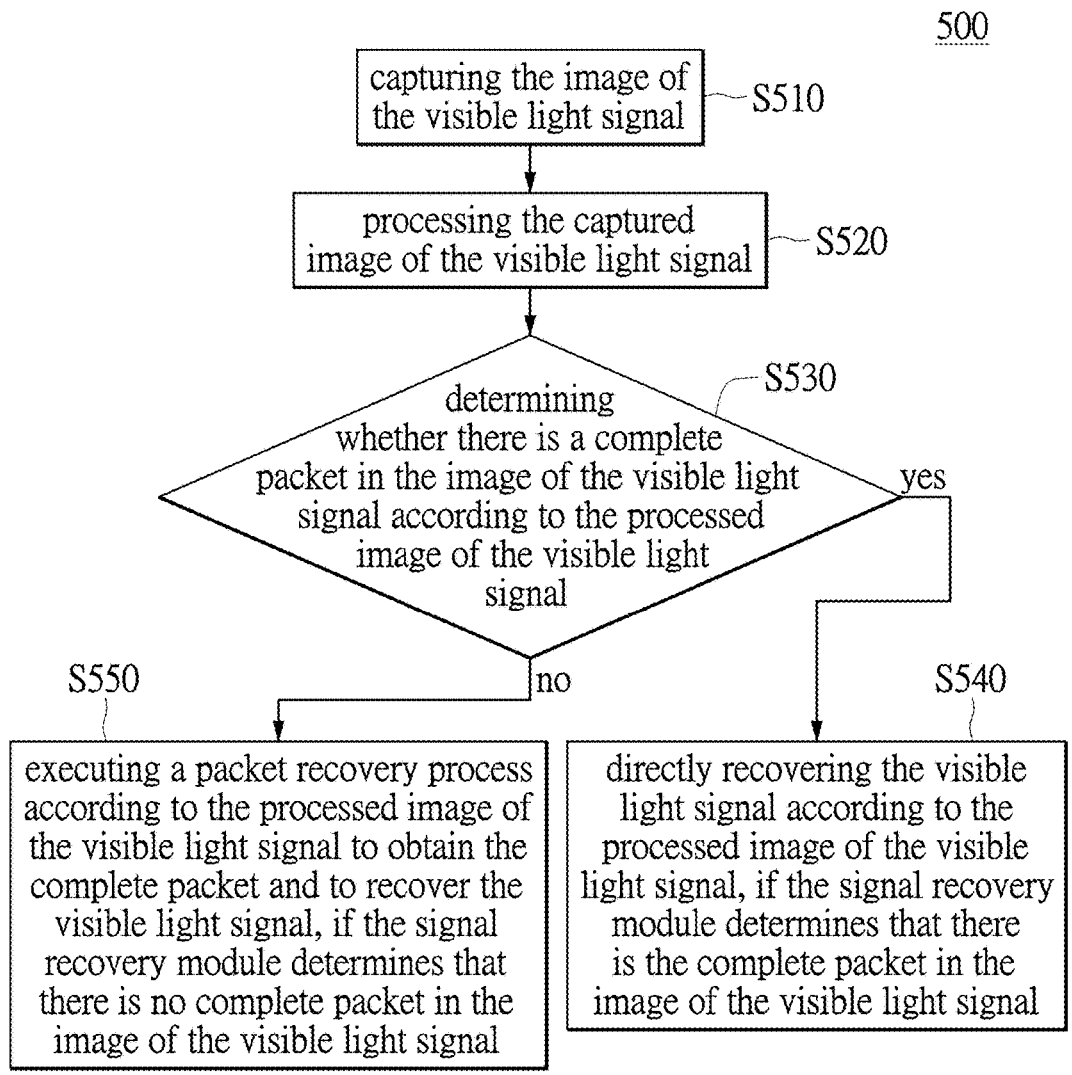
FIG. 5A shows a flow chart of a visible light communication method of one embodiment of the instant disclosure.

Referring to FIG. 5A, FIG. 5A shows a flow chart of a visible light communication method of one embodiment of the instant disclosure. The visible light communication method 500 in this embodiment can be adapted to the visible light communication system 1 illustrated by FIGS. 1, 1A-2B, 3A-3C and 4A-4B, and thus please refer to FIGS. 1, 1A-2B, 3A-3C and 4A-4B for further understanding.

The visible light communication method 500 mainly comprises the following steps: through the image capturing module, capturing the image of the visible light signal (step S510); through the image processing module, processing the captured image of the visible light signal (step S520); and through the signal recovery module, determining whether there is a complete packet in the image of the visible light signal according to the processed image of the visible light signal (step S530). In addition, in step S530, if the signal recovery module 30 determines that there is a complete packet in the image of the visible light signal according to the processed image of the visible light signal, it goes to step S540. In step S540, the signal recovery module 30 directly obtains the packet according to the processed image of the visible light signal, and then recovers the visible light signal sent from the signal transmitter TX. However, in step S530, if the signal recovery module 30 determines that there is no complete packet in the image of the visible light signal according to the processed image of the visible light signal, it goes to step S550. In step S550, the signal recovery module 30 executes a packet recovery process according to the processed image of the visible light signal to obtain the complete packet and then to recover the visible light signal sent from the signal transmitter TX.

Figure 5B:
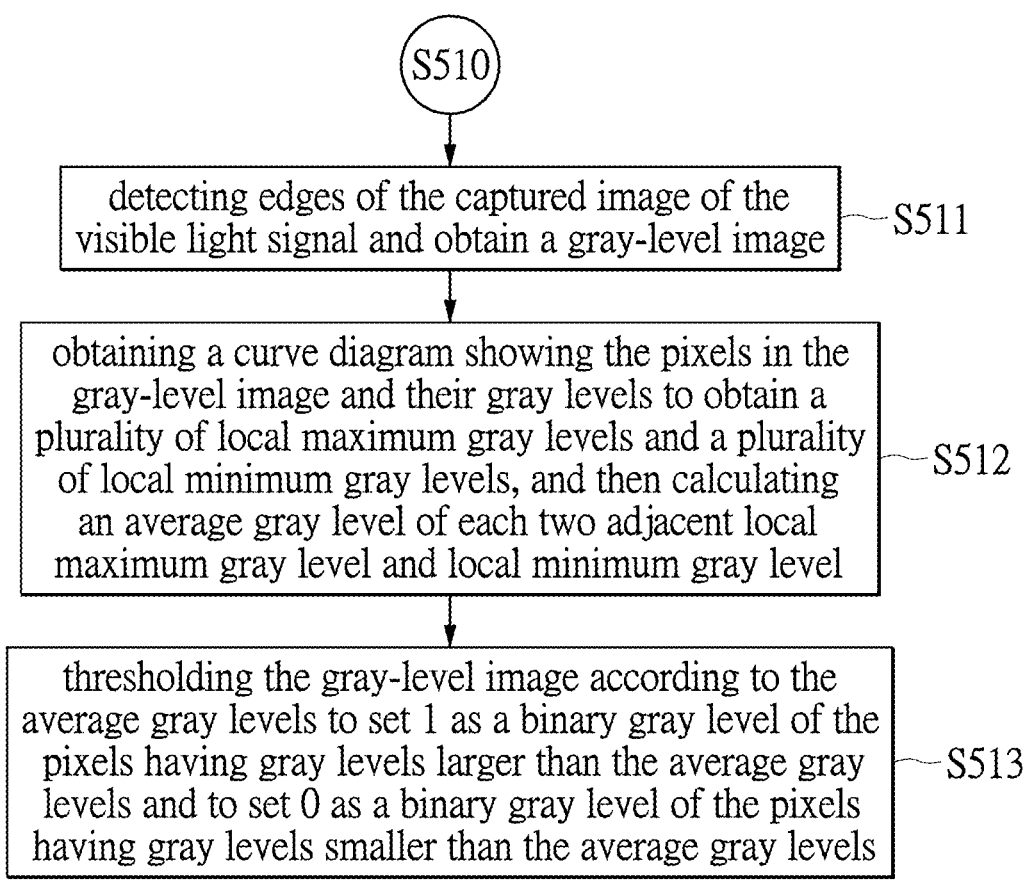
FIG. 5B shows a flow chart of the step in which the image processing module processes an image of a visible light signal in a visible light communication method of one embodiment of the instant disclosure.

It should be noted that, in the visible light communication method 500, the step in which the image processing module 20 processes the captured image of the visible light signal, which is step S510, comprises the following steps. Referring to FIG. 5B, FIG. 5B shows a flow chart of the step in which the image processing module processes an image of a visible light signal in a visible light communication method of one embodiment of the instant disclosure.

Step S510 mainly comprises: detecting edges of the captured image of the visible light signal and obtain a gray-level image (step S511); obtaining a curve diagram showing the pixels in the gray-level image and their gray levels to obtain a plurality of local maximum gray levels and a plurality of local minimum gray levels, and then calculating an average gray level of each two adjacent local maximum gray level and local minimum gray level (step S512); and thresholding the gray-level image according to the average gray levels to set 1 as a binary gray level of the pixels having gray levels larger than the average gray levels and to set 0 as a binary gray level of the pixels having gray levels smaller than the average gray levels (step S513).

Figure 5C:
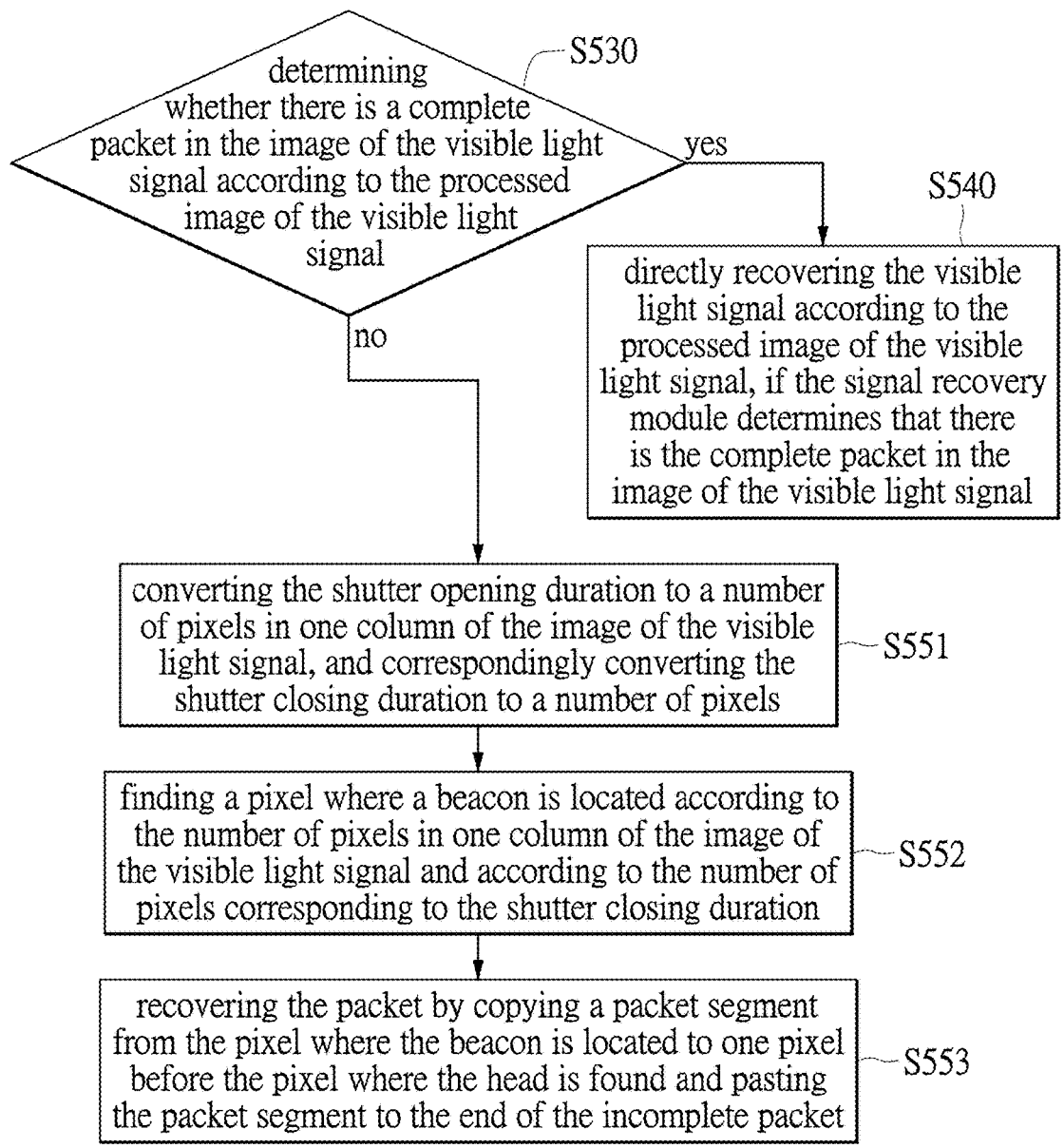
FIG. 5C shows a flow chart of the step in which the signal recovery module executes a packet recovery process according to an image of a visible light signal in a visible light communication method of one embodiment of the instant disclosure.

It should be noted that, in the visible light communication method 500, the step in which the signal recovery module 30 executes the packet recovery process according to the processed image of the visible light signal, which is step S550, comprises the following steps. Referring to FIG. 5C, FIG. 5C shows a flow chart of the step in which the signal recovery module executes a packet recovery process according to an image of a visible light signal in a visible light communication method of one embodiment of the instant disclosure.

Step S550 mainly comprises: converting the shutter opening duration to a number of pixels in one column of the image of the visible light signal, and correspondingly converting the shutter closing duration to a number of pixels (step S551); finding a pixel where a beacon is located according to the number of pixels in one column of the image of the visible light signal and according to the number of pixels corresponding to the shutter closing duration (step S552); and recovering the packet by copying a packet segment from the pixel where the beacon is located to one pixel before the pixel where the header is found and pasting the packet segment to the end of the incomplete packet (step S553).

Relevant details of the steps of the visible light communication method 500 regarding the visible light communication system 1 are illustrated in the embodiments shown in FIGS. 1, 1A-2B, 3A-3C and 4A-4B, and thus it is not repeated thereto. It is clarified that, a sequence of steps of the visible light communication method 500 shown in FIGS. 5A-5C is set for a need to instruct easily, and thus the sequence of the steps is not used as a condition in demonstrating the embodiments of the instant disclosure.

The traditional visible light communication system needs a Photo Detector (PD) configured at a reception end of the visible light communication system. However, the volume of the PD is large so that it needs more room to configure the reception end of the traditional visible light communication system. On the other hand, the visible light communication system provided by the instant disclosure directly uses a camera of a mobile device, such as a CMOS camera of a mobile device, as an image capturing module of a visible light signal receiver. The CMOS camera has a relatively small volume and needs not to be driven by an external power supply as the PD in the traditional visible light communication system.

Moreover, because of the rolling shutter mechanism of the CMOS camera, the signal receiver in the visible light communication system provided by the instant disclosure can receive a signal of which the transmission speed is faster than the frame rate of the CMOS camera.

Most importantly, for a traditional visible light communication system, the same packet needs to be sent at least three times within one image capturing period, and even so, there may be a packet loss problem. Compared with the traditional visible light communication system, for the visible light communication system provided by the instant disclosure, the same packet only needs to be sequentially sent twice within one image capturing period, and the packet is unlikely to be lost because a packet recovery process will be executed if necessary, which actually improves the signal transmission efficiency.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A visible light communication system, comprising:
a signal transmitter, configured to transmit a visible light signal; and
a signal receiver, configured to
capture an image of the visible light signal;
process the captured image of the visible light signal; and
determine whether there is a complete packet in the image of the visible light signal according to the processed image of the visible light signal, wherein the signal receiver includes an image capturing module, an image processing module and a signal recovery module; wherein the signal recovery module directly recovers the visible light signal according to the processed image of the visible light signal, if the signal recovery module determines that there is the complete packet in the image of the visible light signal, and the signal recovery module executes a packet recovery process according to the processed image of the visible light signal to obtain the complete packet and to recover the visible light signal, if the signal recovery module determines that there is an incomplete packet in the image of the visible light signal;
wherein when the signal transmitter is transmitting the visible light signal to the signal receiver, a time duration when two identical packets are sequentially sent exactly equals to an image capturing period of the image capturing module, and wherein the image capturing period comprises a shutter opening duration and a shutter closing duration.

2. The visible light communication system according to claim 1, wherein the image capturing module is a complementary metal oxide semiconductor (CMOS) image sensor.

3. The visible light communication system according to claim 1, wherein when the signal recovery module is determining whether there is the complete packet in the image of the visible light signal, the signal recovery module determines that there is the complete packet in the image of the visible light signal when the signal recovery module finds two headers of the two identical packets in the image of the visible light signal.

4. The visible light communication system according to claim 3, wherein when the signal recovery module is determining whether there is the complete packet in the image of the visible light signal, the signal recovery module determines that there is the incomplete packet in the image of the visible light signal when the signal recovery module finds only a first header of one of the two headers of the two identical packets in the image of the visible light signal, and the signal recovery module executes the packet recovery process according to the image of the visible light signal.

5. The visible light communication system according to claim 4, wherein when the signal recovery module is executing the packet recovery process according to the image of the visible light signal, the signal recovery module is configured to:
convert the shutter opening duration to a first number of pixels in one column of the image of the visible light signal, and correspondingly convert the shutter closing duration to a second number of pixels;
find a pixel where a beacon is located according to the first number of pixels in one column of the image of the visible light signal and according to the second number of pixels corresponding to the shutter closing duration; and
recover the complete packet by copying a packet segment from the pixel where the beacon is located to one pixel before the pixel where a second header of the two headers is found and pasting the packet segment to the end of the incomplete packet.

6. The visible light communication system according to claim 5, wherein when the image processing module is processing the captured image of the visible light signal, the image processing module is configured to:
detect edges of the captured image of the visible light signal and obtain a gray-level image;
obtain a curve diagram showing pixels in the gray-level image and their gray levels to obtain a plurality of local maximum gray levels and a plurality of local minimum gray levels, and then calculate an average gray level of each two adjacent local maximum gray level and local minimum gray level; and
threshold the gray-level image according to the average gray levels to set 1 as a binary gray level of the pixels having gray levels larger than the average gray levels and to set 0 as a binary gray level of the pixels having gray levels smaller than the average gray levels.

7. The visible light communication system according to claim 6, wherein the signal recovery module determines whether a number of sequential pixels having 0 as the binary gray level equals to or larger than a predetermined pixel number, and the signal recovery module determines that the sequential pixels are where the first header or the second header of the two headers of the two identical packets is located, when the signal recovery module determines the number of the sequential pixels having 0 as the binary gray level equals to or larger than the predetermined pixel number.

8. A visible light communication method, adapted to a visible light communication system, the visible light communication system comprising a signal transmitter and a signal receiver, the signal transmitter configured to send a visible light signal, the signal receiver configured to capture an image of the visible light signal and to recover the visible light signal according to the captured image of the visible light signal, wherein the signal receiver comprises an image capturing module, an image processing module and a signal recovery module, the image processing module is connected to the image capturing module, and the signal recovery module is connected to the image processing module, the visible light communication method comprising:
through the image capturing module, capturing the image of the visible light signal;
through the image processing module, processing the captured image of the visible light signal;
through the signal recovery module, determining whether there is a complete packet in the image of the visible light signal according to the processed image of the visible light signal;
through the signal recovery module, directly recovering the visible light signal according to the processed image of the visible light signal, if the signal recovery module determines that there is the complete packet in the image of the visible light signal; and
through the signal recovery module, executing a packet recovery process according to the processed image of the visible light signal to obtain the complete packet and to recover the visible light signal, if the signal recovery module determines that there is an incomplete packet in the image of the visible light signal;

wherein when the signal transmitter is transmitting the visible light signal to the signal receiver, a time duration when two identical packets are sequentially sent exactly equals to an image capturing period of the image capturing module, and wherein the image capturing period comprises a shutter opening duration and a shutter closing duration.

9. The visible light communication method according to claim 8, wherein the image capturing module is a complementary metal oxide semiconductor (CMOS) image sensor.

10. The visible light communication method according to claim 8, wherein step of determining whether there is the complete packet in the image of the visible light signal according to the processed image of the visible light signal comprises:

finding two headers of the two identical packets in the image of the visible light signal; and determining that there is the complete packet in the image of the visible light signal when the two headers of the two identical packets are both found in the image of the visible light signal.

11. The visible light communication method according to claim 10, wherein the step of determining whether there is the complete packet in the image of the visible light signal according to the processed image of the visible light signal further comprises:

determining that there is the incomplete packet in the image of the visible light signal when only a first header of one of the two headers of the two identical packets is found in the image of the visible light signal.

12. The visible light communication method according to claim 11, wherein step of executing the packet recovery process according to the processed image of the visible light signal to obtain the complete packet and to recover the visible light signal comprises:

converting the shutter opening duration to a first number of pixels in one column of the image of the visible light signal, and correspondingly converting the shutter closing duration to a second number of pixels;

finding a pixel where a beacon is located according to the first number of pixels in one column of the image of the visible light signal and according to the second number of pixels corresponding to the shutter closing duration; and recovering the complete packet by copying a packet segment from the pixel where the beacon is located to one pixel before the pixel where a second header of the two headers is found and pasting the packet segment to the end of the incomplete packet.

13. The visible light communication method according to claim 12, wherein step of processing the captured image of the visible light signal comprises:

detecting edges of the captured image of the visible light signal and obtain a gray-level image;

obtaining a curve diagram showing pixels in the gray-level image and their gray levels to obtain a plurality of local maximum gray levels and a plurality of local minimum gray levels, and then calculating an average gray level of each two adjacent local maximum gray level and local minimum gray level; and thresholding the gray-level image according to the average gray levels to set 1 as a binary gray level of the pixels having gray levels larger than the average gray levels and to set 0 as a binary gray level of the pixels having gray levels smaller than the average gray levels.

14. The visible light communication method according to claim 13, wherein step of determining whether there is the complete packet in the image of the visible light signal according to the processed image of the visible light signal further comprises:

determining whether a number of sequential pixels having 0 as the binary gray level equals to or larger than a predetermined pixel number; and determining that the sequential pixels are where the first header or the second header of the two headers of the two identical packets is located, if the number of the sequential pixels having 0 as the binary gray level equals to or larger than the predetermined pixel number.

* * * * *